United States Patent [19]

Stepczyk et al.

[11] Patent Number: 5,721,912
[45] Date of Patent: Feb. 24, 1998

[54] GRAPHICAL USER INTERFACE FOR CREATING DATABASE INTEGRATION SPECIFICATIONS

[75] Inventors: Frank M. Stepczyk, Manhattan Beach; Anthony T. Materna, Glendale, both of Calif.; Boyd Hays, Boulder, Colo.

[73] Assignee: Data Integration Solutions Corp., Gardena, Calif.

[21] Appl. No.: 286,688

[22] Filed: Aug. 5, 1994

[51] Int. Cl.$^6$ .................................... G06F 17/30
[52] U.S. Cl. .................. 395/613; 295/611; 295/612; 295/614; 295/615; 295/208; 295/677
[58] Field of Search .................. 395/600, 613, 395/611, 612, 614, 615, 208, 677

[56] References Cited

U.S. PATENT DOCUMENTS

| | | | |
|---|---|---|---|
| 4,714,995 | 12/1987 | Materna et al. | 395/DIG. 1 |
| 5,421,015 | 5/1995 | Khoyi et al. | 395/650 |
| 5,530,861 | 6/1996 | Diamant et al. | 395/650 |

OTHER PUBLICATIONS

McDonald & Thompson, "Designer's Workbench: The Programmer Environment," The Bell System Technical Journal, vol. 59, No. 9, Nov. 1980, pp. 1793–1809.

Hampel, "Fact Retrieval in the 1980s," What Should Users Expect From Information Storage and Retrieval Systems of the 1980's?, AGARD Conference Proceedings No. 304, Sep. 9–10, 1981, pp. 6–1—6–36.

Friedenson, Breiland & Thompson, "Designers's Workbench: Delivery of CAD Tools," 19th Design Automation Conference (IEEE), Jun. 1982, paper 5.2 pp. 15–22.

Hampel, Bailey, Kawin, Lann, McGrogan, Scott, Stammers, & Thomas, "'TIS'—Intelligent Gateway Computer for Information and Modeling Networks—Overview," National Technical Information Service (UCRL–53439), Aug. 1983.

Marcus, "An Experimental Comparison of the Effectiveness of Computers and Humans as Search Intermediaries," Journal of the American Society for Information Science, Nov. 1983, pp. 381–404.

(List continued on next page.)

Primary Examiner—Thomas G. Black
Assistant Examiner—Cheryl Lewis
Attorney, Agent, or Firm—Irell & Manella LLP

[57] ABSTRACT

The present invention provides a method, and corresponding apparatus, for interactively creating database integration specifications comprising a workflow specification, communication scripts, and data translators. The invention includes steps and means for interactively creating a workflow specification which graphically depicts the flow of control and data among the various communication scripts and data translators. Each communication script, data translator, or other integration object that is part of the overall workflow specification is graphically represented by corresponding, cursor-sensitive display objects. These display objects are then interactively interconnected so as to depict the desired flow of control and data. The method further includes steps and means for specifying content for the actual communication scripts and data translators. Specifying a particular communication script or data translator is preferably initiated by interactively selecting the cursor-sensitive display object corresponding to that particular communication script or data translator. In a further feature of the invention, software data objects representing the communication scripts, data translators, and the workflow specification are stored in an object-oriented database. The database integration specification is ultimately compiled into executable form.

14 Claims, 8 Drawing Sheets

OTHER PUBLICATIONS

Hampel, Bollinger, Gaynor & Oldani, "An Online Directory of Databases for Material Properties," May 1984, prepared for presentation ot the Ninth International CODATA Conference, Jerusalem, Israel, Jun. 24–28, 1984.

Williams, "Electronic Databases," Science, vol. 228, No. 4698, Apr. 26, 1985, pp. 445–456.

Hampel, Barker, Berch, Kawin, Lann, McGrogran, Sharpe & Winiger,"'TIS'—The Intelligent Gateway Processor," Proceedings of the 18th Hawaii International Conference on System Sciences 1985, Software—vol. II, pp. 802–813.

Hampel, "Integration of Communications With the Intelligent Gateway Processor," prepared for presentation to the Electric Power Research Institute Seminar on Integrated Power Plant Computer Communications, San Francisco, California, Aug. 25–27, 1986.

Berch, "Implementation of the Intelligent Gateway Processor Using UNIX," Lawrence Livermore National Laboratory (UCRL 95241) (DE86 015089) ASCENT*gateway, Control Data Corporation, © 1987.

Data Integration Solutions Corporation, "Integration Works User Guide".

GRAPHICAL USER INTERFACE FOR CREATING DATABASE INTEGRATION SPECIFICATIONS

FIELD OF THE INVENTION

This invention relates to the field of computer database technology, and in particular to techniques for integrating heterogeneous databases.

BACKGROUND

The existing trend in computer database systems is moving from specialized, proprietary systems (so-called "legacy" databases) to distributed, open, client-server architectures. This trend is expected to continue until no more legacy databases exist. However, that process could take several decades, because of the magnitude of existing legacy application software. Providing inter-operability between new database systems, on the one hand, and existing legacy systems, on the other hand, in a transparent fashion (i.e., with little or no change to the existing legacy system), has become an important priority. We refer to the process of providing such inter-operability as database integration.

There presently exist a variety of prior art techniques and products for database integration. Many of these products require the user to create "scripts" and other integration specifications defining the work that the underlying computer system must perform in order to accomplish integration. Thus, several prior art systems employ user-defined communication "scripts" in order to log into target computer host systems by mimicking the actions of a terminal user, and to thereby extract appropriate data. For example, Ascent is such a product, developed by the Control Data Corporation. Ascent was itself derived from the Technology Information System developed by Lawrence Livermore National Laboratories; work on that system originally commenced in the early 1970's. Another commercial product in the prior art is Surround by Cambridge Technology Group. Surround similarly utilizes communication scripts to log into heterogeneous computer systems and extract data on behalf of users. U.S. patent application Ser. No. 07/979,997, filed Nov. 23, 1992 and now abandoned, describes a similar use of various scripts in order to integrate heterogeneous databases.

However, the prior art has generally failed to provide high-quality, user-friendly, graphical interface tools to facilitate the rapid creation of the various communication scripts, data translators, and workflow specifications that are required. By "workflow" specification, we mean a specification of the overall flow of control and data among the various scripts, translators, data sources, and other integration activities and entities that must be implemented in order to support actual user requests for access across heterogeneous databases. The abandoned patent application mentioned above does propose the general idea of interactive tools for creating communication scripts and data translators, but very little detail is provided about how such tools would actually look or function. Even more importantly, the abandoned patent application provides no disclosure or suggestion whatsoever of any graphical interface tools for creating workflow specifications.

Accordingly, a high-quality, graphical user interface for facilitating the creation of workflow specifications, communication scripts, data translators, and other integration specifications is greatly needed.

SUMMARY OF THE INVENTION

Accordingly, it is an object of the present invention to provide a high-quality, graphical user interface that facilitates the creation of workflow specifications, communication scripts, data translators, and other integration specifications. The present invention accomplishes this and other objectives by providing a method (and corresponding apparatus) for creating a database integration specification comprising a graphical workflow specification, communication scripts, and data translators. The method includes the step of interactively generating a plurality of cursor-sensitive display objects corresponding to the various communication scripts, data translators, and any other integration objects that will be used to accomplish integration at run-time. These display objects are then graphically interconnected so as to depict a flow of control and data among corresponding scripts and translators. The resulting diagram constitutes the graphical workflow specification. The method further includes specifying actual content for the communication scripts and data translators. Ultimately, the database integration specification is compiled in appropriate fashion into an executable format.

Techniques for interactively-creating the workflow specification, the communication scripts, and the data translators are disclosed. In one advantageous feature of the invention, the generation of a particular communication script or data translator is initiated by interactively selecting the cursor-sensitive display object corresponding to that particular communication script or data translator. In a further feature of the invention, software objects describing the communication scripts, data translators, and workflow specification are stored in an object-oriented repository.

DETAILED DESCRIPTION OF THE INVENTION

Architectural Overview

Figure 1:
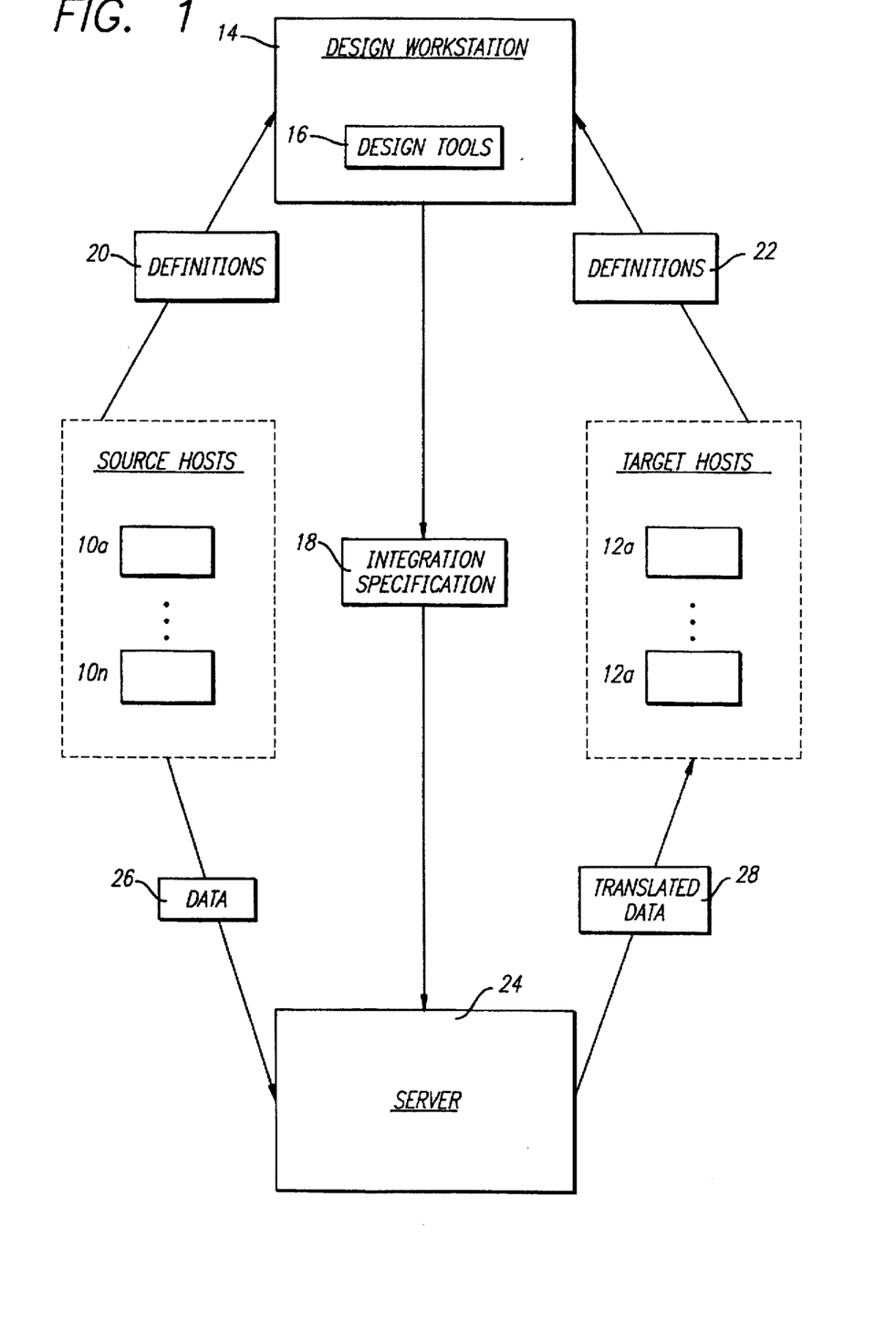
FIG. 1 provides an architectural overview of a preferred embodiment of an integrated system in accordance with the present invention.
Figure 2:
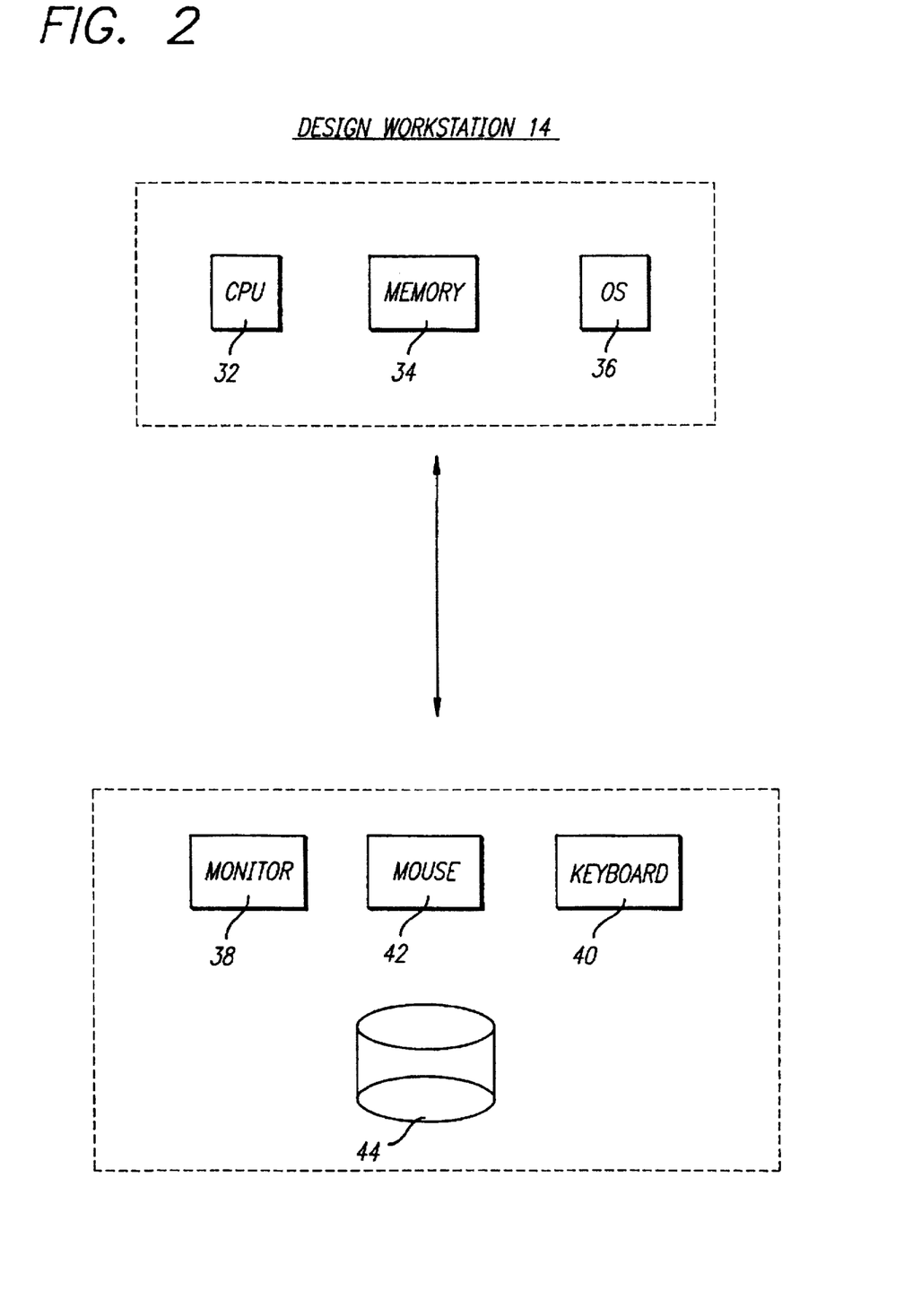
FIG. 2 illustrates a prior art, computer workstation that may be utilized in implementing the present invention.

FIG. 1 broadly outlines the basic architecture of a system that is integrated in accordance with the present invention. Legacy source hosts 10a–n and new target hosts 12a–n host the respective databases being integrated. Using the computer facilities of prior art design workstation 14 (described below in connection with FIG. 2), and a set of interactive design tools 16 as disclosed herein, the individual(s) responsible for implementing the integration plan (hereinafter referred to as the "user," except where otherwise noted) creates database integration specification 18. Hosts 10a–n and 12a–n, respectively, provide data definitions 20 and 22 to design workstation 14, for use by the design tools in constructing this integration specification. Once integration specification 18 has been compiled into an appropriate, executable format, that specification is provided to and carried out upon computer server 24, thereby allowing data 26 from legacy source hosts 10a–n to be transparently accessed as translated data 28 by end-users of new database target hosts 12a–n.

The generation of integration specification 18 with the help of interactive design tools 16 represents a primary aspect of the present invention. Design tools 16 are preferably utilized in conjunction with the computer platform resources of prior art design workstation 14 depicted in FIG. 2. Computer workstation 14 may be a Sun SPARCstation™, Apple Macintosh Quadra™, or other typical, prior art workstation or high-performance personal computer suitably equipped for interactive graphics. Computer workstation 14 preferably includes at least central processing unit 32; internal memory 34 (preferably eight or more megabytes of RAM); operating system 36 (such a variant of Unix, Windows, or OS/2); and interactive I/O facilities including monitor 38, keyboard 40, mouse 42, and hard disk drive 44.

As noted, a primary focus of the present invention is to provide a novel set of design tools, featuring a powerful, graphical user interface, for interactively creating database integration specification 18. For purposes of further illustration, a run-time execution product that uses integration specifications of this nature to actually perform database integration is described in the Integration Works™ User Guide included in the Appendix hereto, and especially in Chapters 12–16 thereof. In addition, as noted in the Background Section, various prior art products and technology known to those of skill in the art are also available that use integration specifications of this nature in order to implement database integration. Accordingly, the remainder of the present Detailed Description will focus on a set of graphical, interactive designer tools in accordance with the present invention.

Figure 3:
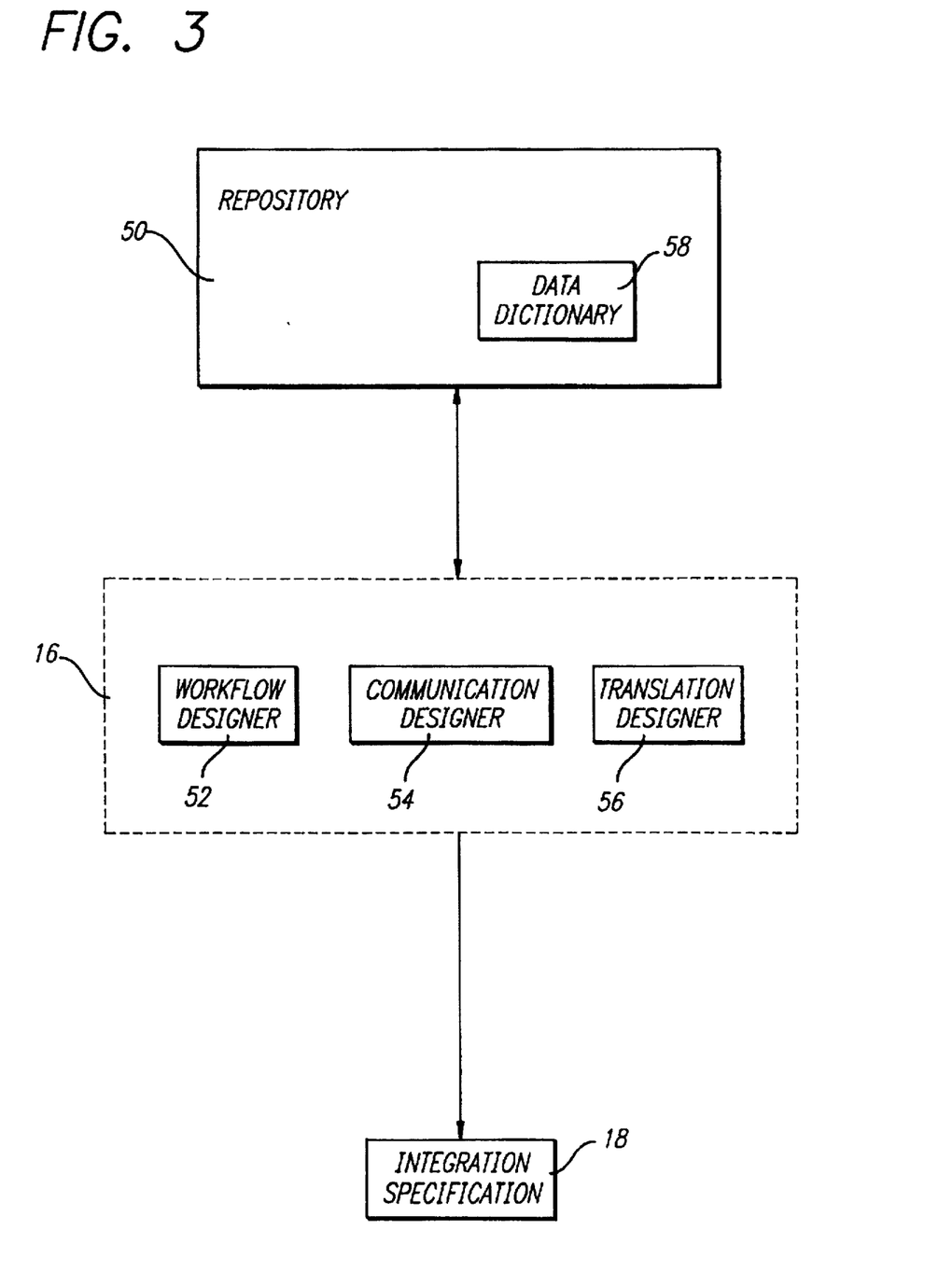
FIG. 3 provides an architectural overview of integration specification design tools in accordance with the present invention.

As shown in FIG. 3, design tools 16 preferably include workflow designer 52, communication designer 54, and data translation designer 56. Each of these three tools will be described in much greater detail in subsequent sections. As shown further in FIG. 3, repository 50 preferably acts as a central dictionary for the design tools. Repository 50 provides each design tool with its base input, and may also save output generated by each design tool; preferably, the repository is implemented as an object-oriented database.

Repository 50 further includes data dictionary 58, as shown in FIG. 3. Data dictionary 58 defines and describes characteristics and rules regarding the data that is to be integrated within a particular system. Preferably, various data importation tools and schema design tools may be used to create the content of data dictionary 58. One embodiment of such tools is described at some length in Chapters 5 and 9 of the Appendix hereto. Data dictionary 58 is primarily utilized during the design process by data translation designer 56, as will be explained in the subsequent section devoted to the details of that design tool.

Table 1 below lists the primary categories of integration information produced by workflow designer 52, communication designer 54, and data translation designer 56, in accordance with the present invention. This information collectively makes up integration specification 18.

TABLE 1

| DESIGNER TOOLS | OUTPUT INFORMATION | PURPOSE |
|---|---|---|
| Workflow Designer | Workflow specification | Graphically represents the overall flow of control and data among communication scripts, translators, and other integration objects. This specification controls all interactions of an integration job within the system. |
| Communication Designer | System description language ("SDL") scripts | By capturing and then editing a user session with each host machine, this tool produces an SDL-encoded script that, when executed, performs the same actions that a terminal user would perform to gain access. |
| Translation Designer | Data translators | Allows users to specify translations between different data formats, in a convenient "outline" form. |

Workflow designer 52, communication designer 54, and data translation designer 56, will now each be described in detail.

Workflow Designer

Workflow designer 52 is responsible for the specification of an overall integration plan. Workflow designer 52 is preferably used to specify the various activities that will be carried in performing integration (i.e., communication scripts, data translators, and external utility programs where necessary), and to define their sequencing and interrelationship. Files utilized for temporary storage purposes by the various integration activities, known as data stores, are also preferably included in the workflow specification, as are external environment objects (such as the host database systems being integrated). When the workflow specification is complete, it is compiled and is then eventually used by the run-time integration engine (as discussed earlier) to coordinate the actual flow of control and data among integration activities and data stores.

In accordance with the present invention, workflow designer 52 enables users to interactively construct a graphical workflow specification illustrating the various integration activities and data stores, and the flow of control and data among them. The graphical workflow specification consists of a graphically interconnected network of display objects, where each display object corresponds to an integration activity, data store, or other integration object.

Figure 4:
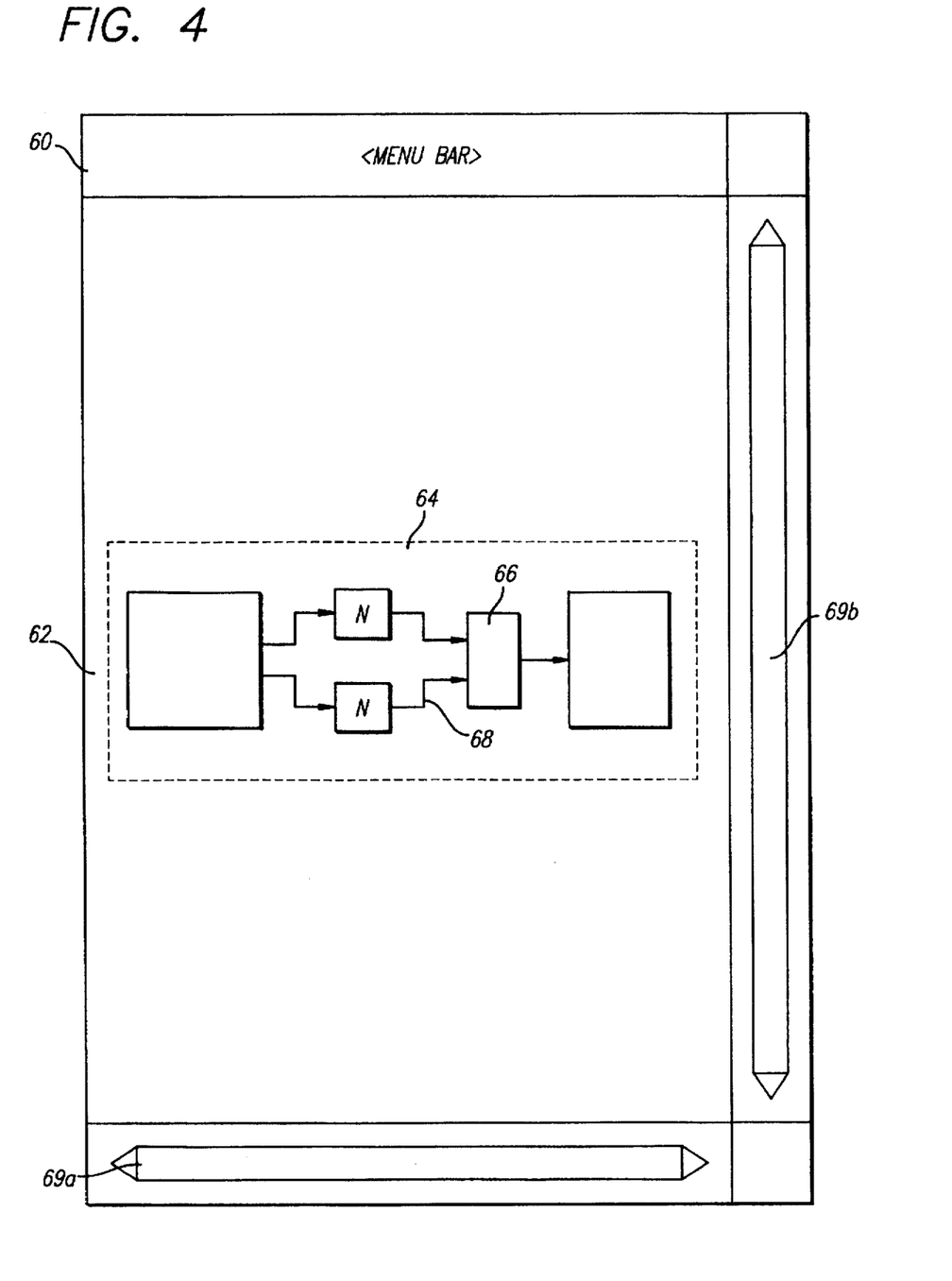
FIG. 4 illustrates an interactive window for graphical workflow design, in accordance with a preferred embodiment of the present invention.

FIG. 4 outlines a representative window interface that may be provided by workflow designer 52 in order to facilitate this interactive process. A window of the general structure shown in FIG. 4 is preferably presented on monitor 38 of workstation 14, and is interactively controlled using mouse 42 and keyboard 40 as described further below. This window is preferably subdivided into several compartments or panes, each having its own associated role in the workflow design process. Menu bar pane 60 provides access to various commands regarding the workflow specification as a whole, such as compiling, saving, or quitting. Most of the window space is preferably occupied by display pane 62, which is used to display workflow specification 64. The workflow specification basically consists of a plurality of display objects, such as rectangle 66, and interconnections in the form of directional arrows such as arrow 68. In accordance with the present invention, the display objects correspond to various integration objects as noted above, while the interconnections depict the sequence and flow of control and data among the objects. (A more detailed examination of an example graphical workflow specification will be presented shortly in connection with FIG. 5.) Panes 69a and 69b, respectively, contain horizontal and vertical scroll bars or the like, so that workflow specification 64 may still be adequately handled even if is too large to be displayed all at once in pane 62.

In order to create a new display object, the user interactively calls up an appropriate menu, preferably by depressing a button or the like on mouse 42 while the associated cursor is located within display pane 62 but not within the space of an existing display object. The object creation menu (described in the Integration Works™ User Guide as the "Page Menu") preferably includes command options for creating a new communication script display object, a new data translation display object, a new data store display object, a new external task display object, or a new external environment display object. An additional category of display objects is the conditional object, which is not yet described in the current version of the Integration Works™ User Guide but is explained herein below. The various categories of display objects presented in pane 62 are preferably distinguished by their shape and/or other visual detail, as will be explained in more detail below in connection with the workflow example of FIG. 5.

Once a new display object is created, the user can associate or link the display object with a specific corresponding integration object. For example, for a display object corresponding to a data store, external task, or external environment object, the user provides a name and/or path information so as to identify the actual, corresponding file or program. With regard to communication scripts and data translators, a highly advantageous feature of the present invention is that the script or translator corresponding to each such display object may itself be defined and edited using graphical workflow specification 64 as a launch point. In other words, if a button or similar device on mouse 42 is signalled while the associated cursor is located within the space of a display object within pane 62, a specialized pop-up display object command menu is preferably presented. For display objects that correspond to either communication scripts or data translators, the display object command menu will preferably include a command to "open" and specify the contents of the corresponding script or translator, using communication designer 14 and translator designer 16 as discussed at length below. More details regarding these pop-up command menus are included in the Appendix hereto at Chapter 7.

As noted, the directional flow of control and data among the various integration entities corresponding to the display objects is graphically represented by interconnecting the objects with directional arrows. These connecting arrows may be interactively created by pressing a button or the like on mouse 42 while the cursor is positioned over the right edge of a source display object or the left edge of a target display object. The directional arrow points away from the source object and toward the target object. Once one end of the connecting arrow has been created on one object, the other end may be "dragged" using mouse 42 in conventional fashion, and then "dropped" upon the other object that the user desires to connect thereto.

Preferably, a display object may be moved and repositioned by first selecting the display object by positioning the cursor within the space of that desired display object, and then "dragging" the object using mouse 32, as well known to those of ordinary skill in the general art of computer GUI's. Selected display objects may also preferably be deleted, such as by interactively selecting a "delete" command option from the display object menu. The interconnecting arrows are then preferably redrawn to match the current positioning of the display objects in pane 22, as described in the Integration Works™ User Guide, Chapter 7.

With regard to conditional branches, a conditional branch is preferably interconnected as the target of a communication script. The targets of a branch may be a plurality of various, potential integration activities, such as a selection of different data translators. When a display object corresponding to a conditional branch has been interconnected to a new target activity, the user is permitted to interactively specify an associated logical condition for that target. Preferably, invoking the pop-up command menu for the conditional branch will also allow the user to interactively modify the specified conditions. In any case, the conditions are interpreted as intended for evaluation with respect to the return code returned by the communication script at run-time. Thus, a conditional branch following a communication script serves as a selector switch, selecting one among a set of potential activities depending on the return code that the communication script yields at run-time.

Figure 5:
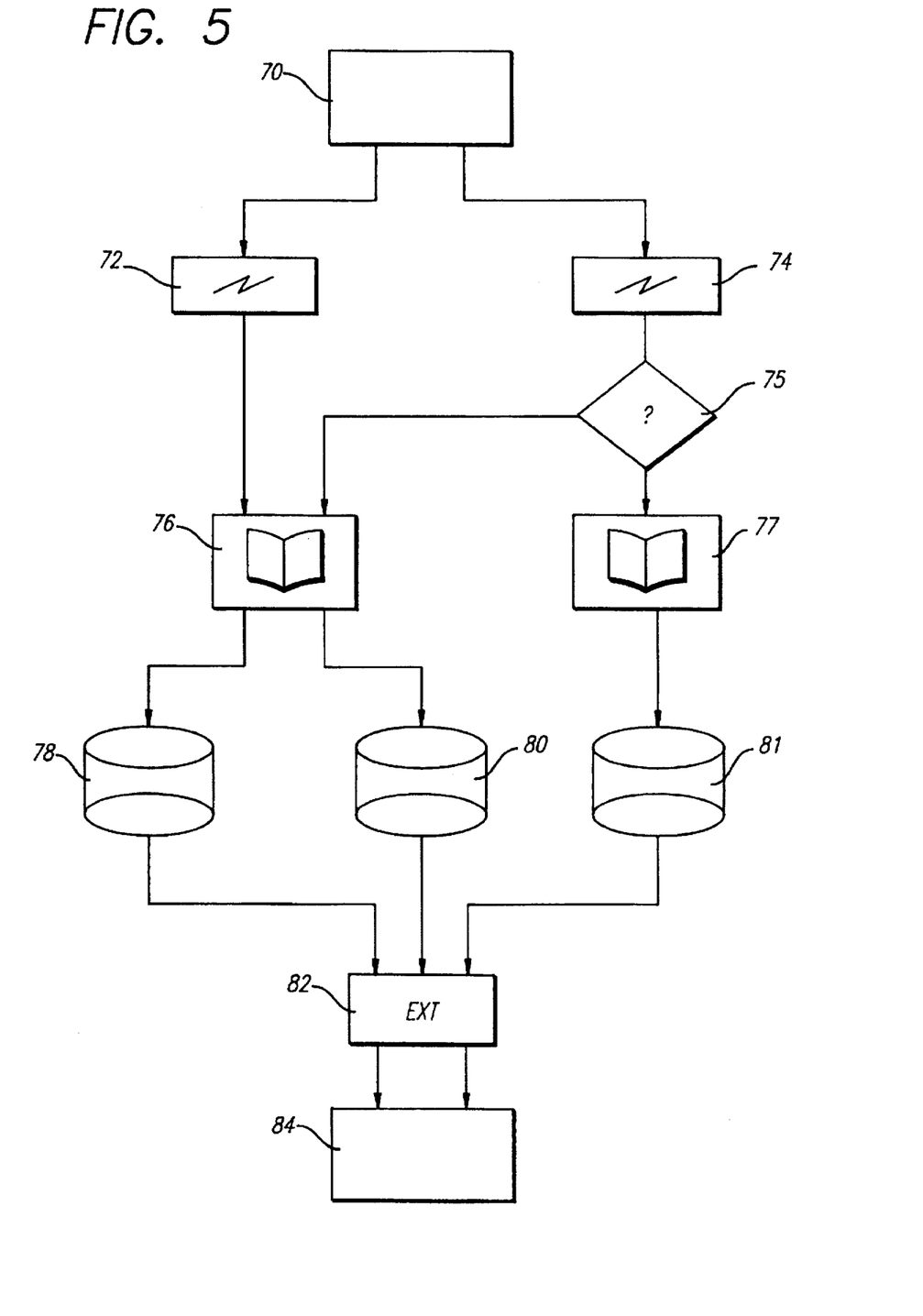
FIG. 5 shows a simple example of a graphical workflow specification, in accordance with a preferred embodiment of the present invention.

For purposes of illustration, FIG. 5 depicts a simple example of a graphical workflow specification. In this example, the following arbitrary convention is followed: blank rectangles (such as display objects 70 and 84) represent external environment objects; rectangles containing a communication symbol (such as display objects 72 and 74) correspond to communication scripts; rectangles containing a book or dictionary symbol (such as display objects 76 and 77) correspond to a data translator; data storage symbols (such as display objects 78, 80, and 81) correspond to data stores; rectangles (such as display object 82) containing the legend "EXT" correspond to external utility programs; and diamonds containing a "?" (such as display object 75) correspond to conditional branches.

In the example of FIG. 5, display object 70, which is depicted as the starting point for workflow, corresponds to a legacy application program and its associated data on a host computer system. Display objects 72 and 74 correspond to communication scripts, that are to be carried out in parallel, for accessing and retrieving requested legacy data. The data retrieved by script 72 is passed on to a data translator represented by display object 76, whereas the data retrieved by script 74 is routed to one of two data translators (corresponding to display objects 76 and 77, respectively), depending on the return code returned by communication script 74 and the truth values of the conditions corresponding to display object 75. Note that the directional arrows interconnecting icons 70, 72, 74, 75, 76, and 77 graphically depict the sequence and flow of control and data as just described.

Continuing on with the example of FIG. 5, display objects 78, 80, and 81 correspond to data stores. The two groups of retrieved data, which have now been translated by the translator into a format compatible with a new database system currently in use, are each temporarily and respectively stored in a data store (either 78 and 80, or 78 and 81, depending on conditional branch 75, as previously explained). Display object 82 corresponds to an external utility program, such as a bulk database loader, which loads the translated data from the data stores into the new database management system corresponding to display object 84. Once again, note that the directional arrows throughout FIG. 5 track the sequence and flow of control and data that has been described.

The example of FIG. 5 has been presented for purposes of illustration only. Those of ordinary skill in the art will appreciate that by using workflow designer 52 as described herein, users can interactively generate arbitrarily complex, conditionalized workflow specifications as needed to describe and implement any given database integration problem.

Ultimately, graphical workflow specification 64 must be converted into an equivalent description that can be processed as part of integration specification 18 by computer server 24. Menu bar pane 60 preferably provides access to command options for invoking this conversion task. The commercially available Integration Works™ product includes such a converter. Preferably, the conversion results in a textual script having the precise syntax set forth in Chapter 7 of the Integration Works™ User Guide (included in the Appendix). Given this syntax, those of ordinary skill in the art will be able to implement their own versions of a conversion utility, as desired for particular applications, in fairly straightforward fashion. Note that the script syntax described in Chapter 7 of the Appendix is geared toward a Unix-based run time environment; those of ordinary skill in the art will be able to substitute an analogous script syntax if a different run-time environment is desired.

Communication Designer

Figure 6:
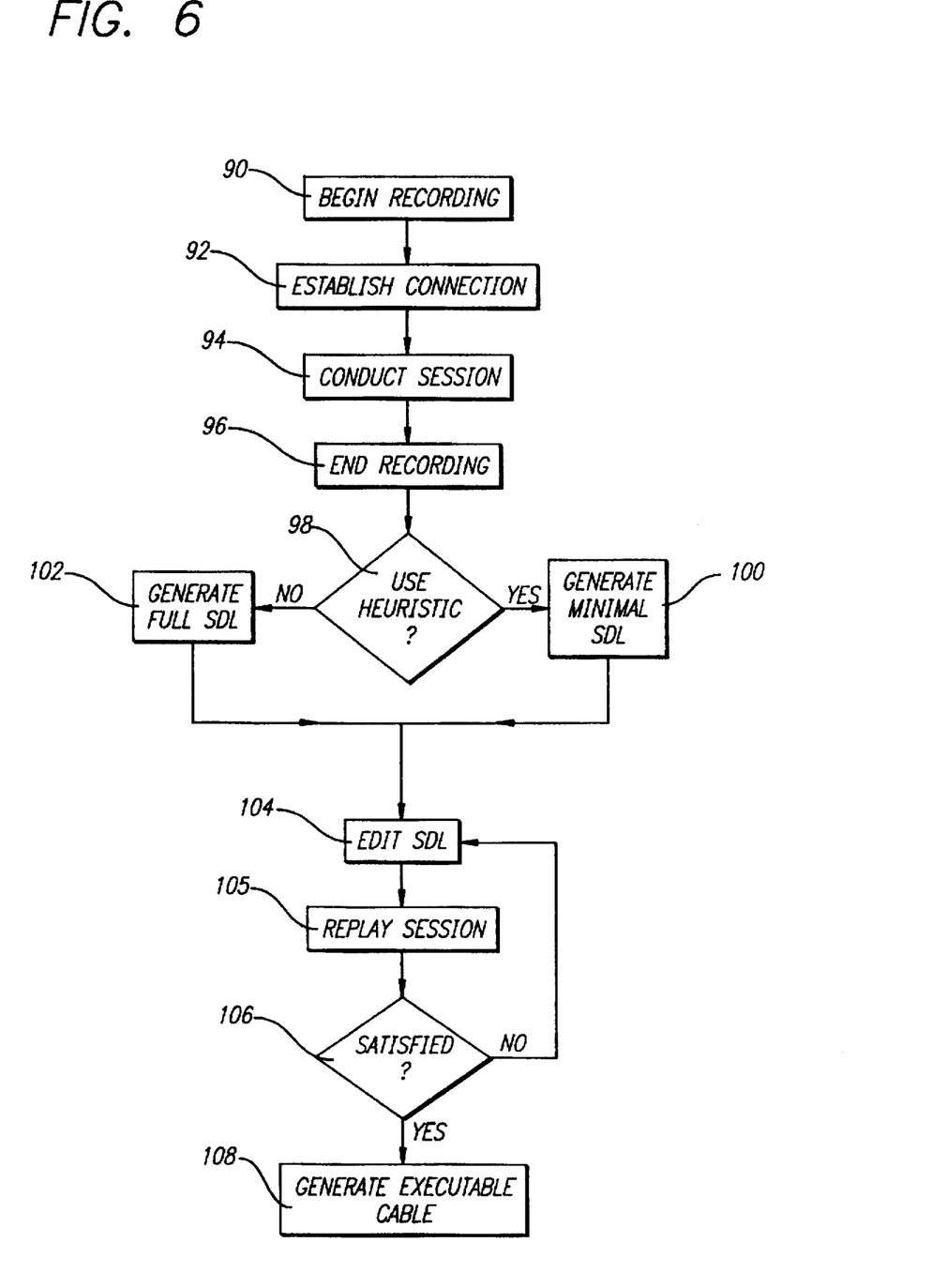
FIG. 6 presents a flowchart depicting a sequence of operations performed in generating a communication script, in accordance with a preferred embodiment of the present invention.

FIG. 6 presents a flowchart depicting a sequence of operations performed in generating a communication script, in accordance with a preferred embodiment of the present invention. The first major component in this process is recording or "capturing" a representative user communication session between workstation 14 and a selected host system (10a–n or 12a–n). An exemplary, convenient user interface is described in the first portion of chapter 8 of the Appendix for this purpose. With reference to FIG. 6, at step 90 the user commands communication designer 54 at workstation 14 to begin recording a communication session. At step 92, the user establishes a remote connection with the desired host system, preferably with the assistance of user friendly terminal emulation software such as the "Connection Dialogue" interfaces described in chapter 8 of the Appendix. Once a connection has been established, the user conducts a normal, representative communication session with the remote host system, as indicated at step 94. All of the user's input, and the host system's responses, will be continually recorded. When the desired session has been completed, the user requests that recording be terminated, at step 96.

The next major component in the process of creating a communications script is converting the captured user communication session into a command script format. The scripting language employed for this purpose should preferably be based on the 1988 CCITT System Description Language ("SDL") standard for distributed communications systems. In SDL, the behavior of a distributed system is described in a stimulus/response fashion using extended finite state machines. Details regarding the SDL scripting language, as well as preferred enhancements for purposes of the present invention, are set forth in Chapter 11 of the Appendix.

At steps 98–102 of FIG. 6, an initial SDL script is generated as a series of states mirroring the precise sequence of user actions and host system responses contained in the captured user communication session. As indicated at step 98, the user is preferably given the option of requesting that communications designer 56 generate either: (a) a complete SDL script whose states correspond to the entire dialogue that has been recorded in the captured user session, or (b) a heuristically optimized SDL script, reflecting only essential portions of the captured user communication session. A reasonable heuristic for these purposes is to include states corresponding to all user activities, but to only include host system responses that directly precede some user response. The premise in this heuristic is that the systems final response is what the user is interested in (i.e., what the user needs to know to formulate his next response), and that any intermediate output by the host system need not be explicitly modeled in the state machine defined by the SDL script. Either way, the result of steps 98–102 is a simplified first-cut at an SDL script for handling communications sessions of similar nature to the captured session. Subsequent editing of this SDL script is required, however, because the initially generated script can only reproduce the captured dialogue in slavish fashion, and will not include any information for handling communications sessions more generally. Therefore, the next step in the overall process is for the user to iteratively edit the SDL script so that more generalized expectations and requirements can be accommodated. This aspect of the process is reflected in steps 104–106 of FIG. 6.

Figure 7:
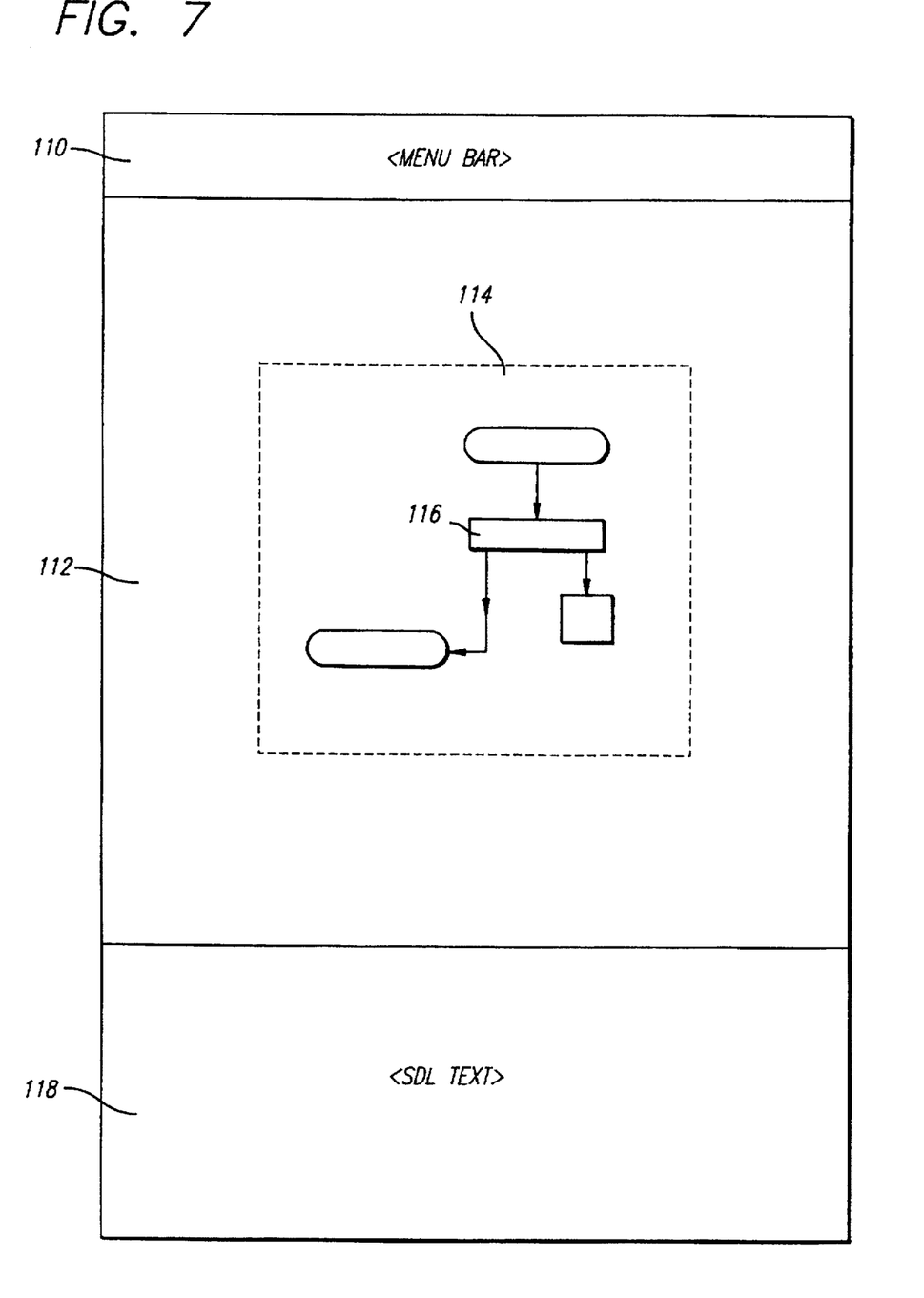
FIG. 7 illustrates an interactive window for editing an SDL communication script, in accordance with a preferred embodiment of the present invention.

More specifically, at step 104 the user begins to edit the first-cut SDL script that has been generated. FIG. 7 outlines an interactive window that may preferably be used for this purpose. The window is preferably is divided up into several component panes. In one embodiment of the present invention, pane 112 displays a graphical view of the state machine defined by the SDL script, As shown in FIG. 7, graphical view 114 is a flow diagram, where display objects such as rectangle 116 correspond to SDL states, and where the graphical interconnections among these display objects reflect the sequential relationship among the states. Generating a flow diagram of this nature, given a structured SDL state machine description, is a very straightforward task for communications designer 56, as those of ordinary skill in the art will readily appreciate. In order to edit the contents of the SDL script, the user selects a desired portion of the script by selecting (using mouse 42) a display object within graphical view 114, corresponding to the particular state that the user wishes to edit. Upon this selection, the actual SDL text defining that state is preferably displayed in text editor pane 118. Scroll bars may also preferably be provided for use with both pane 112 and pane 118, as described previously regarding FIG. 4; the scroll bars have here been omitted from FIG. 7 for purposes of simplicity and clarity.

Further details and alternative embodiments regarding the SDL's script editor are described in the latter portion of Chapter 8 of the Appendix. Also, as indicated in FIG. 6 at steps 104, 105 and 106, the editing process continues in iterative fashion, until the user is satisfied with the SDL script. During this process, at step 104, the user may preferably switch out of the editor window and into another window to replay the originally captured communications session, in order to help the user understand the expectations and structure of the communications session more clearly.

When the user is finally satisfied with the SDL communication script, at step 108 the SDL script is translated into equivalent executable code. In a preferred embodiment of the invention, the menu bar of pane 110 provides access to commands invoking suitable translators or compilers for this purpose. For example, the commercially available Integration Works™ product includes a C++ code generator; those of ordinary skill in the art can construct a similar code translator in straightforward fashion, in accordance with the detailed SDL grammar set forth in Backus Normal Form (BNF) in Chapter 11 of the Integration Works™ User Guide (included in the Appendix). The resulting C++ code can be compiled and linked into executable code for the target computer platform, using a standard C++ compiler.

Data Translation Designer

Data translation designer 16 is used to interactively construct data translation specifications. Data translation designer 16 utilizes a well-known user interface model often known as the "outlines" model. This model divides information into two basic categories, input and output. In the present application, the "input" category is associated with data records from a source host system that are to be converted for compatibility with a heterogeneous target system; the "output" category is associated with the record format required by the target system.

Figure 8:
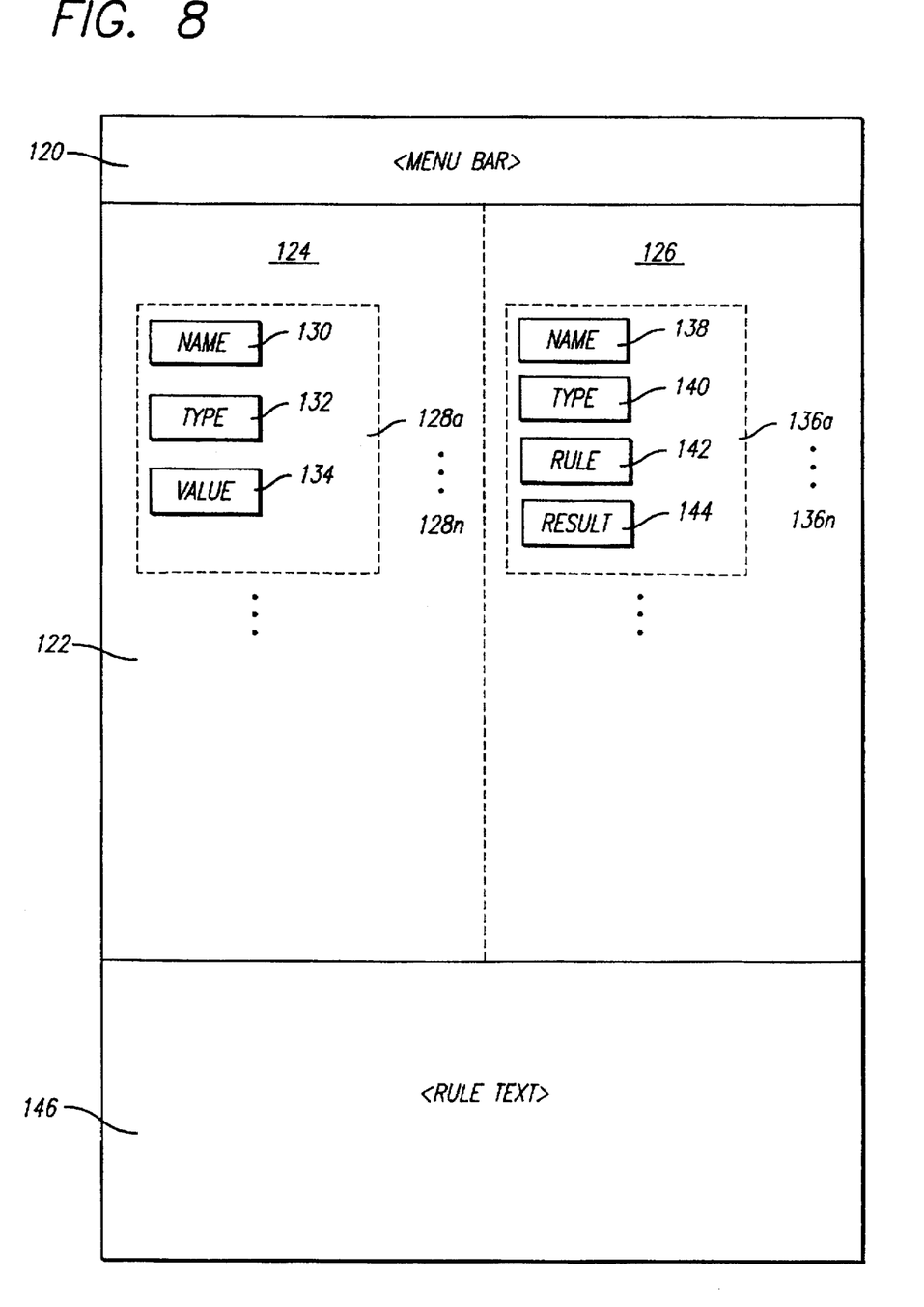
FIG. 8 illustrates an interactive window for defining a data translator, in accordance with a preferred embodiment of the present invention.

FIG. 8 illustrates an interactive window for defining a data translator, in accordance with a preferred embodiment of the present invention. Once again, the window preferably contains multiple panes. Pane 122 is further subdivided into two parts, corresponding respectively to the "input" and "output" components of the outline. Input component 124 displays a "view" of a source data record, including name 130, type 132, and sample value 134 associated with each one of fields 128a–n in the source record. Similarly, output component 126 displays a view of a corresponding target data record, including name 138, type 140, and rule 142, and resulting value 144, associated with each one of fields 136a–n in a corresponding target record. Rule 142 is interactively composed and edited by the user to define the relationship between the value of a particular target field and the value of one or more corresponding source data fields. Result 144 represents the result of actually applying the target data field's rule 142 with respect to sample value 134 for the associated source fields. A simple (although not unrealistic) example of rule 142 might be that all leading or trailing blanks in the "home address" field of a source data record must be deleted in the corresponding target record field. Chapter 10 of the Appendix provides further, extensive details regarding the nature of such rules and a convenient high-level syntax for specifying such rules.

The "views" of source and target records that have been referred to must accurately reflect the data constraints defined in the source and target databases. These definitions and constraints are preferably "imported" or loaded from the source and target host systems of interest, and into repository 50 and data dictionary 58. Tools such as the environment editor and view editor described in Chapter 5 of the Appendix may be used to facilitate the importation of data definitions and the interactive construction of appropriate "views," as will be readily appreciated by those of ordinary skill in the relevant art. Translation designer 16 ultimately accesses view information as needed from repository 50 and data dictionary 58, as noted earlier in the Architectural Overview section of this description.

As already noted, it is the user's responsibility to define translation rule 142 for each data field. Preferably, translation designer 16 includes interactive support for facilitating this task. Pane 146 may comprise a textual editor, wherein the current contents of rule 142 for a selected target field 136 are displayed and edited. Chapter 10 of the Appendix contains a detailed description of the interactive editing facilities that are included in a preferred embodiment of the invention. That exemplary embodiment will enable those of skill in the art to readily construct similar embodiments, or to construct variations thereof in accordance with the aesthetic or functional needs of particular users and systems.

The set consisting collectively of rule 142 as defined for each field comprises a data translation specification for the data record of interest. Ultimately, this specification, which is preferably composed and edited by the user in a high-level format as discussed, must be converted into an executable form. For this purpose, data translation designer 16 preferably includes command options, interactively accessible from menu bar pane 120, for converting the translation specification defined by the user into equivalent C++ source code. The commercially available Integration Works™ product includes such a translator, and those of ordinary skill in the art can readily construct such a translator based on the structured syntax for translation rules described in Chapter 10 of the Integration Works™ User Guide included in the Appendix. Menu bar 120 also preferably offers access to commands for compiling and linking the C++ code thereby generated into executable code for the target computer platform. Standard C++ compilers may be used for this purpose.

Integration Work™

For purposes of further illustrating a preferred embodiment of the present invention in the context of an overall system for achieving integration among heterogeneous databases, a copy of the Integration Works™ User Guide Manual is included in an Appendix and is incorporated in this Detailed Description of the Invention in its entirety by this reference.

While preferred embodiments of the present invention have now been described in detail for purposes of illustration, it will be recognized by those of skill in the art that various and numerous modifications may be made to the detailed description provided herein without departing from the spirit and scope of the invention. For example, those of ordinary skill in the art will readily recognize that numerous variations on the structure and appearance of menus, windows, icons, and other interactive display objects may be implemented in accordance with the aesthetic and functional tastes and requirements of particular end-users or computer systems. Accordingly, the scope of the present invention is not limited except as set forth in the following claims.

We claim:

1. A method for interactively creating a database integration specification, said database integration specification comprising a graphical workflow specification, one or more communication scripts, and one or more data translators, said method comprising the following steps:
    providing a graphical user interface for forming the graphical workflow specification including the steps of
        generating a plurality of cursor-sensitive display objects corresponding to the communication scripts and the data translators; and
    interconnecting the plurality of display objects so as to depict a flow of control and data among the corresponding communication scripts and data translators, thereby forming the graphical workflow specification;
    specifying the communication scripts;
    specifying the data translators; and
    compiling the database integration specification into an executable format.

2. The method of claim 1, wherein the plurality of display objects further includes at least one display object corresponding to a conditional branch.

3. The method of claim 1 further including the step of storing, in an object-oriented database, a plurality of data objects for describing the database integration specification.

4. The method of claim 1 wherein the steps of specifying the communication scripts and the data translators each include the step of interactively selecting the cursor-sensitive display objects corresponding to the respective communication scripts and data translators.

5. The method of claim 1 wherein the step of specifying the communication scripts further includes the steps of capturing a user communication session, converting the user communication session into an SDL script, and editing the SDL script.

6. The method of claim 4 wherein the step of converting the user communication session into an SDL script further includes the step of automatically generating an abbreviated version of the user communication session.

7. The method of claim 1 wherein the step of specifying the data translators further includes the step of displaying, in a single window, a plurality of input field definitions, along with a plurality of output field definitions, each of the output field definitions corresponding to one or more of the input field definitions.

8. An apparatus for interactively creating a database integration specification, said database integration specification comprising a graphical workflow specification, one or more communication scripts, and one or more data translators, said apparatus comprising:

graphical user interface means for forming a graphical workflow specification including means for generating a plurality of cursor-sensitive display objects corresponding to the communication scripts and the data translators; and means for interconnecting the plurality of display objects so as to depict a flow of control and data among the corresponding communication scripts and the data translators, thereby forming the graphical workflow specification;

means for specifying the communication scripts;

means for specifying the data translators; and means for compiling the database integration specifying into an executable format.

9. The apparatus of claim 8, wherein the plurality of display objects further includes at least one display object corresponding to a conditional branch.

10. The apparatus of claim 8 further including an object-oriented database storing a plurality of objects describing the database integration specification.

11. The apparatus of claim 8 wherein the means for specifying the communication scripts and the data translators each include means for interactively selecting the cursor-sensitive display objects corresponding to the respective communication scripts and data translators.

12. The apparatus of claim 8 wherein the means for specifying the communication scripts further include means for capturing a user communication session, means for converting the user communication session into an SDL script, and means for editing the SDL script.

13. The apparatus of claim 12 wherein the means for converting the user communication session into an SDL script further include means for automatically generating an abbreviated version of the user communication session.

14. The apparatus of claim 8 wherein the means for specifying the data translators further include means for displaying, in a single window, a plurality of input field definitions, along with a plurality of output field definitions, each of the output field definitions corresponding to one or more of the input field definitions.

* * * * *